Figure 4:
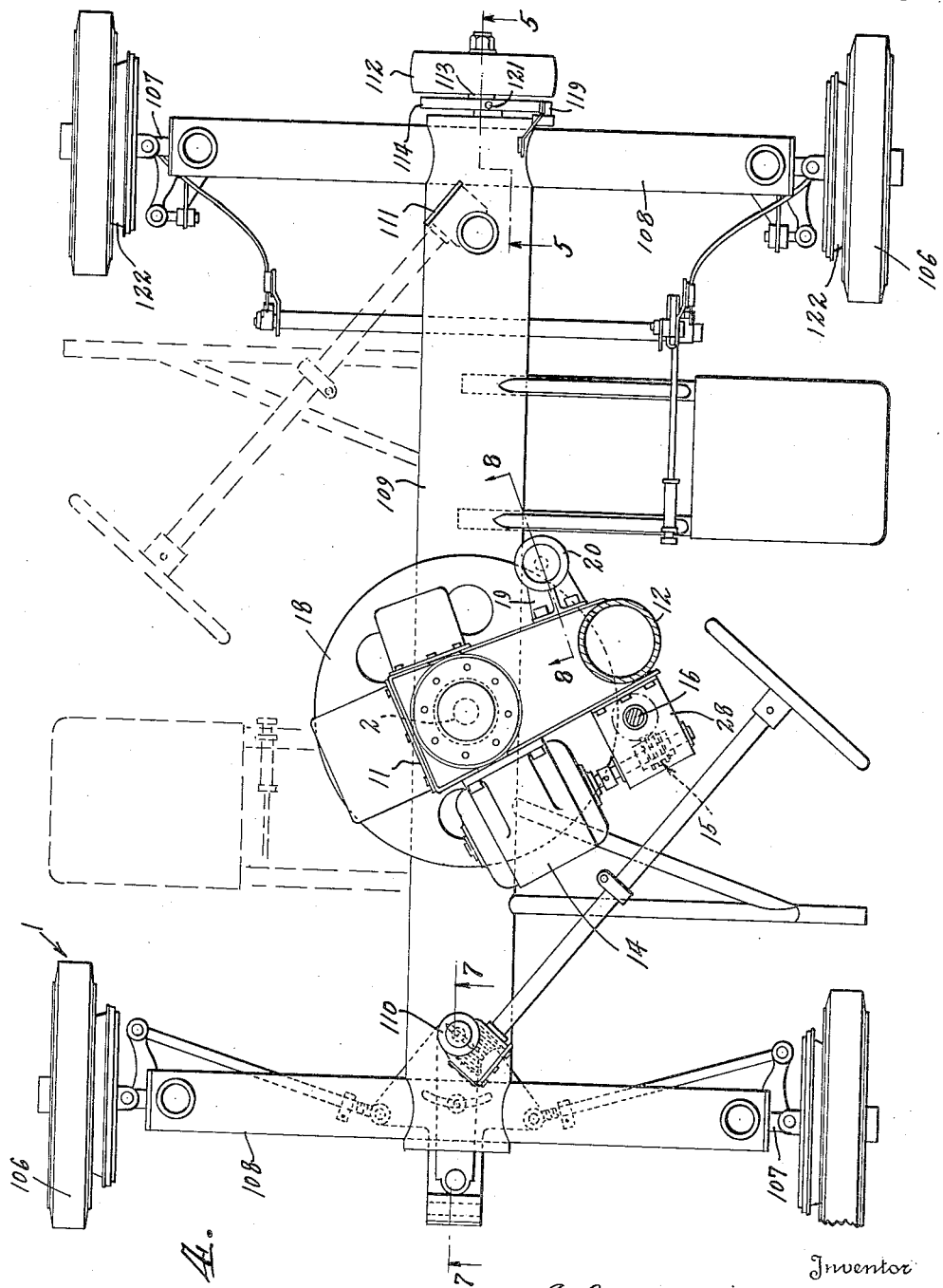

Aug. 13, 1940.   J. C. ARNOLD   2,211,088
CAMERA TRUCK
Filed Oct. 3, 1939   7 Sheets-Sheet 1
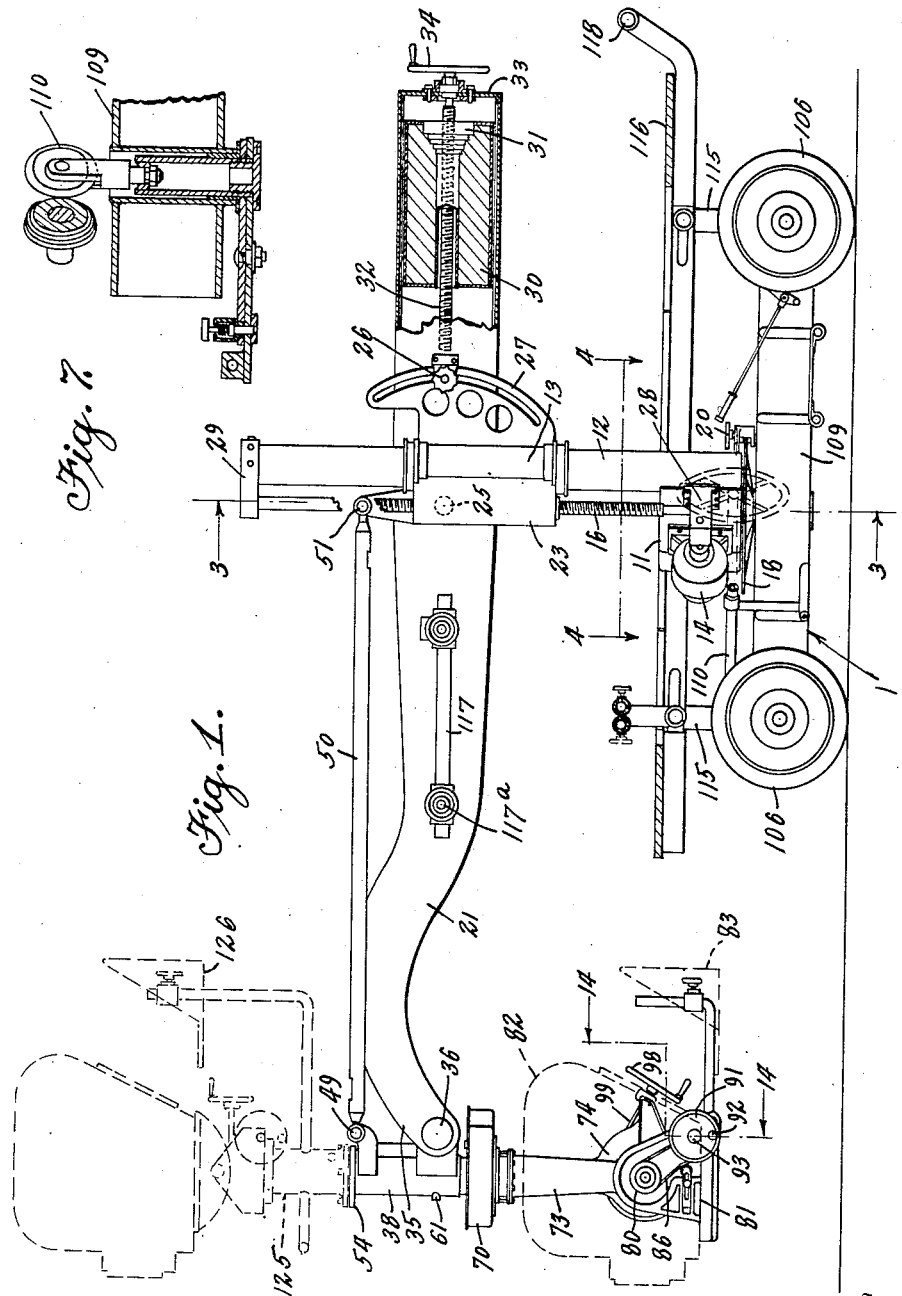
Inventor
John C. Arnold
By Lyon & Lyon
Attorneys

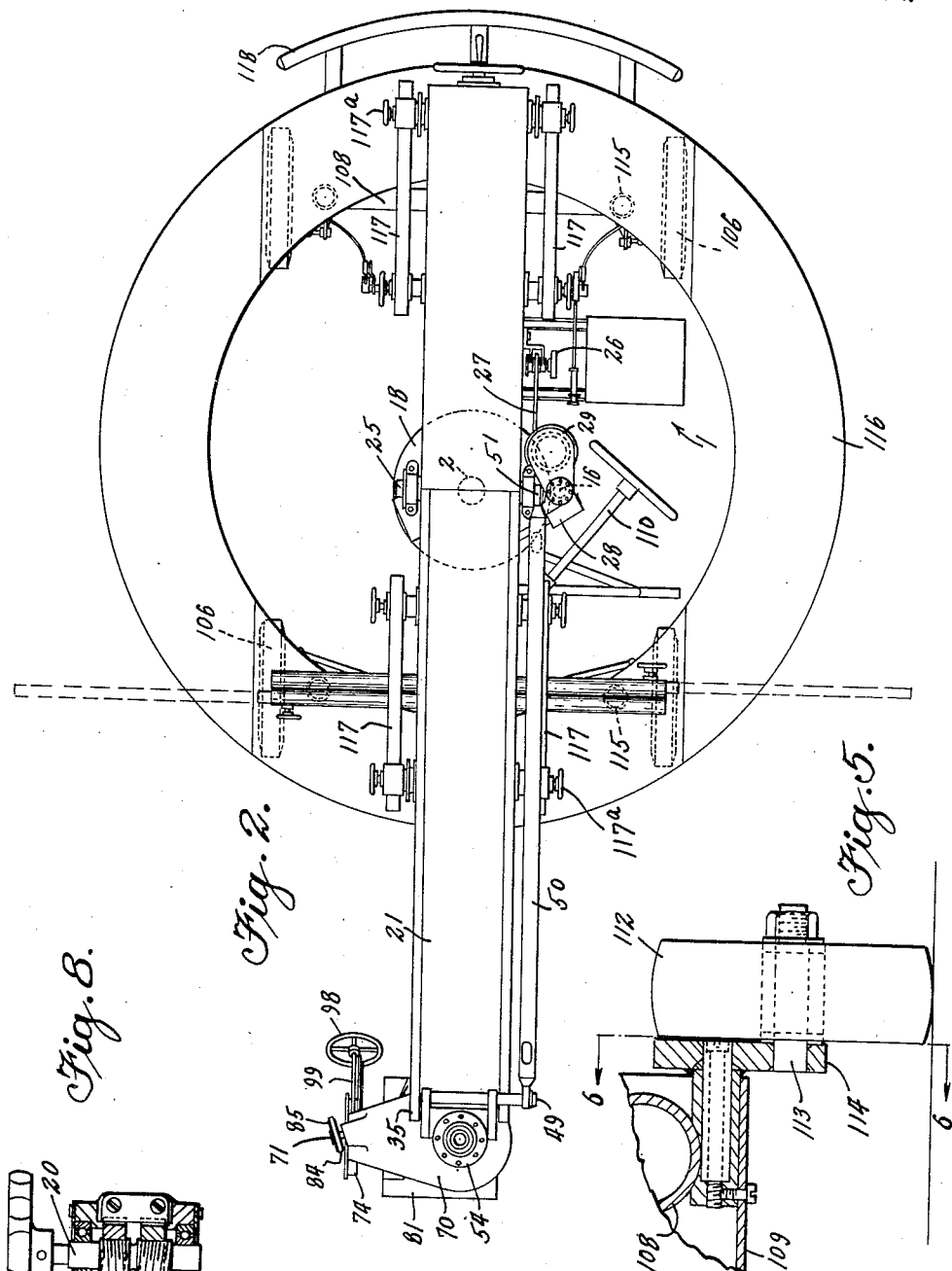

Aug. 13, 1940.  J. C. ARNOLD  2,211,088
CAMERA TRUCK
Filed Oct. 3, 1939  7 Sheets-Sheet 3
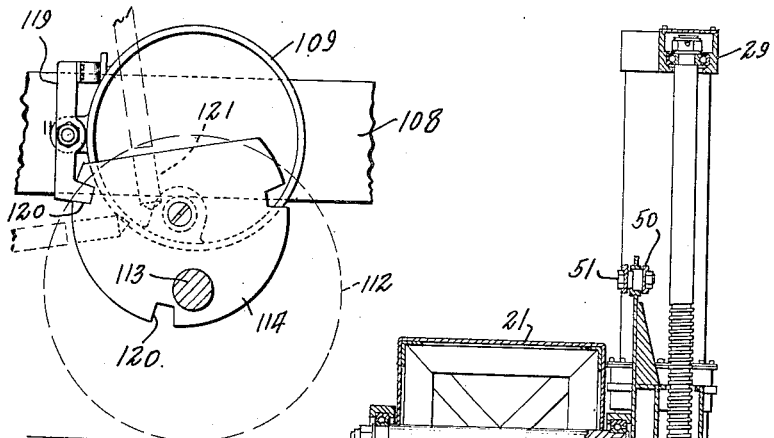
Fig. 6.
Fig. 3.
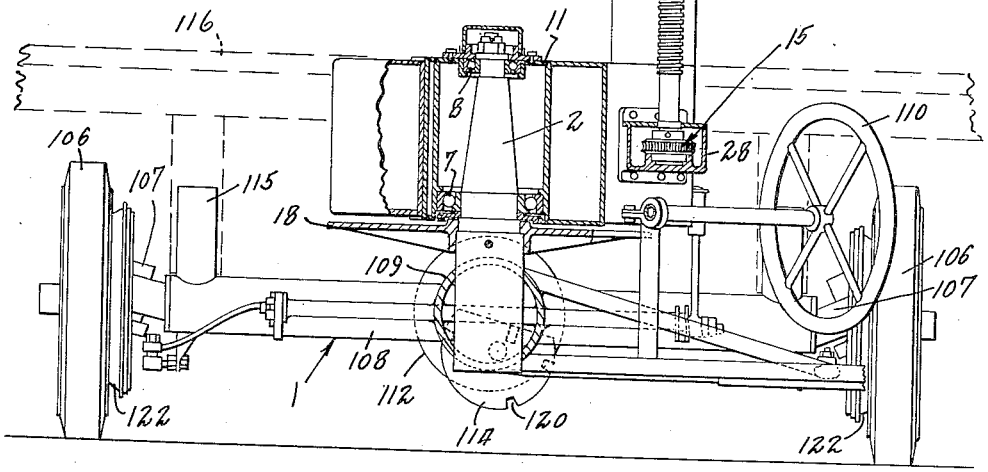
Inventor
John C. Arnold
By Lyon & Lyon
Attorneys Aug. 13, 1940.　　　　　J. C. ARNOLD　　　　　2,211,088
CAMERA TRUCK
Filed Oct. 3, 1939.　　　　7 Sheets-Sheet 4

Inventor
John C. Arnold
By Lyon & Lyon
Attorneys

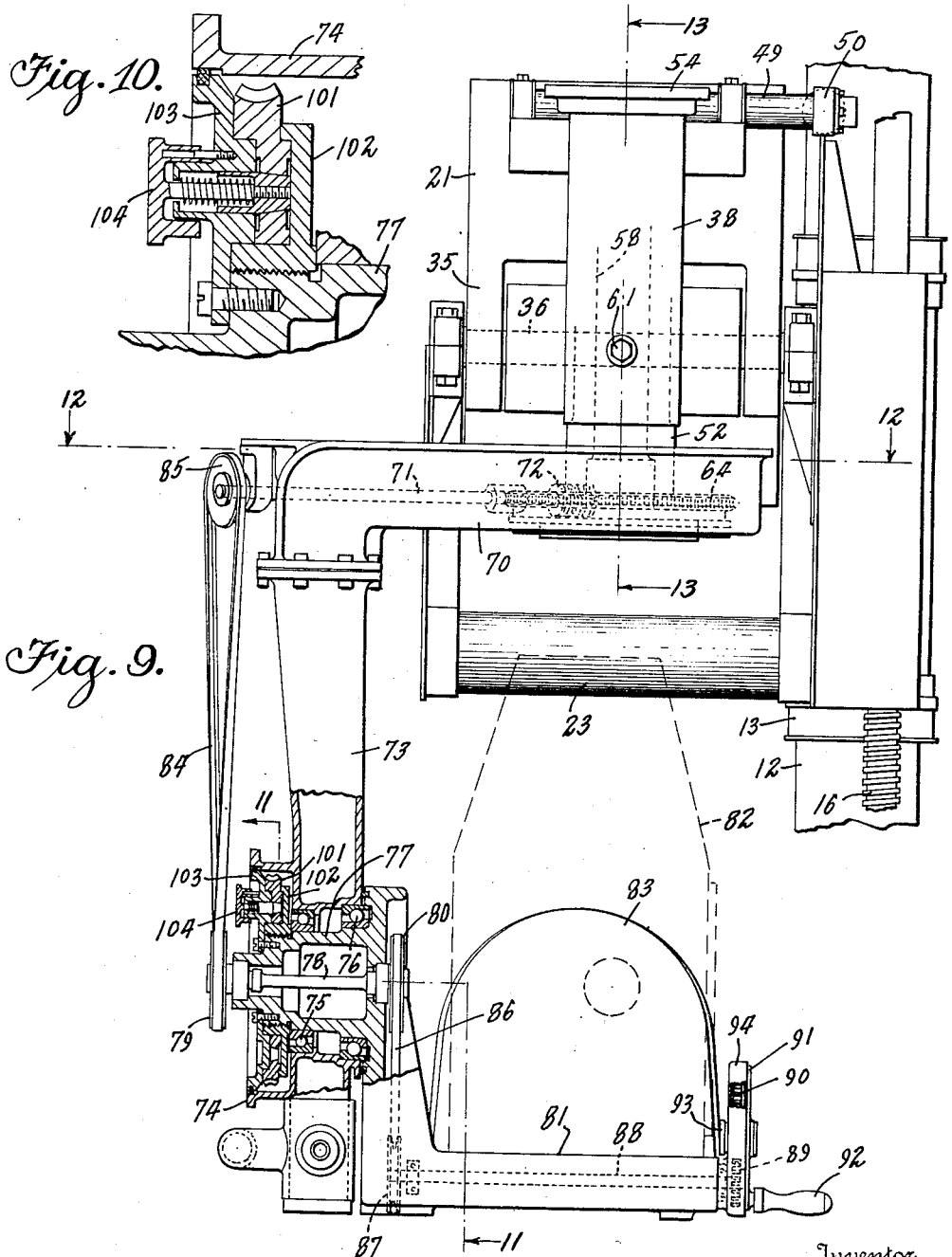

Aug. 13, 1940.    J. C. ARNOLD    2,211,088
CAMERA TRUCK
Filed Oct. 3, 1939    7 Sheets-Sheet 6
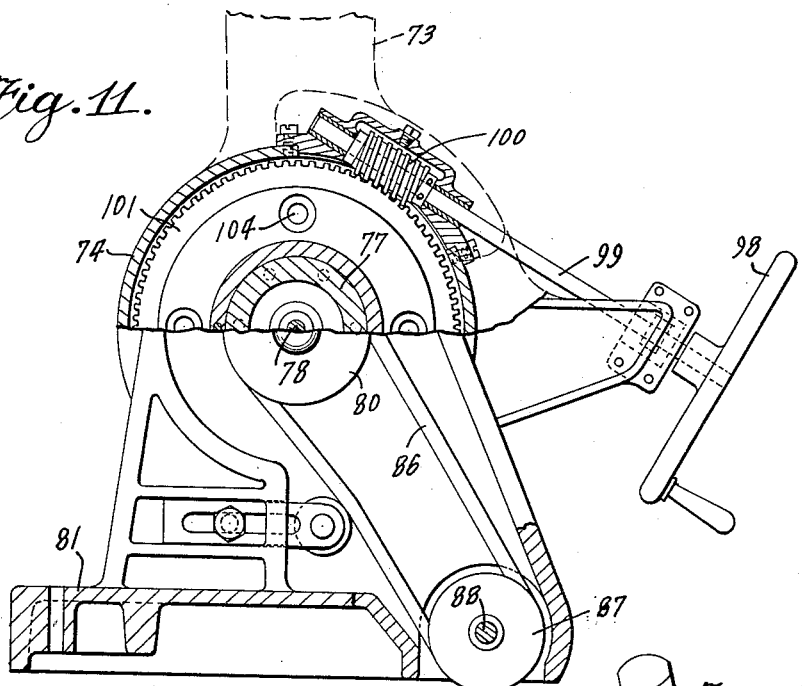
Fig. 11.
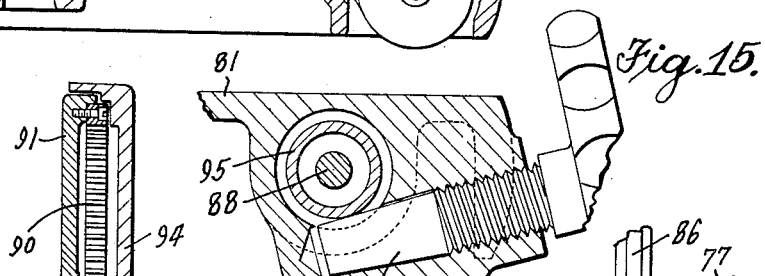
Fig. 15.
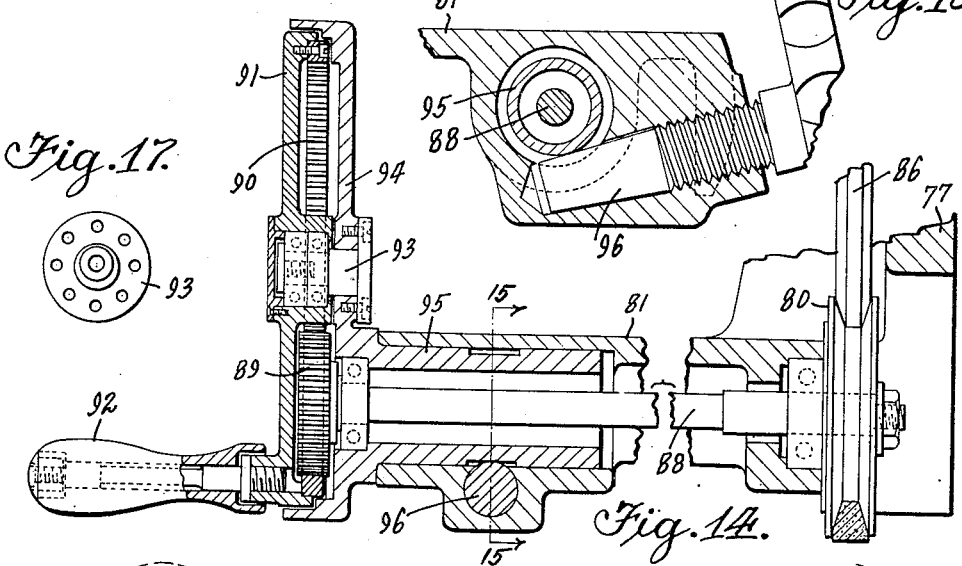
Fig. 17.
Fig. 14.
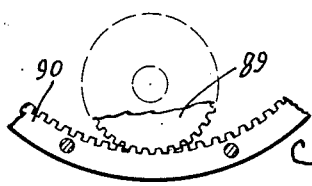
Fig. 16.
Inventor
John C. Arnold
By Lyon & Lyon
Attorneys

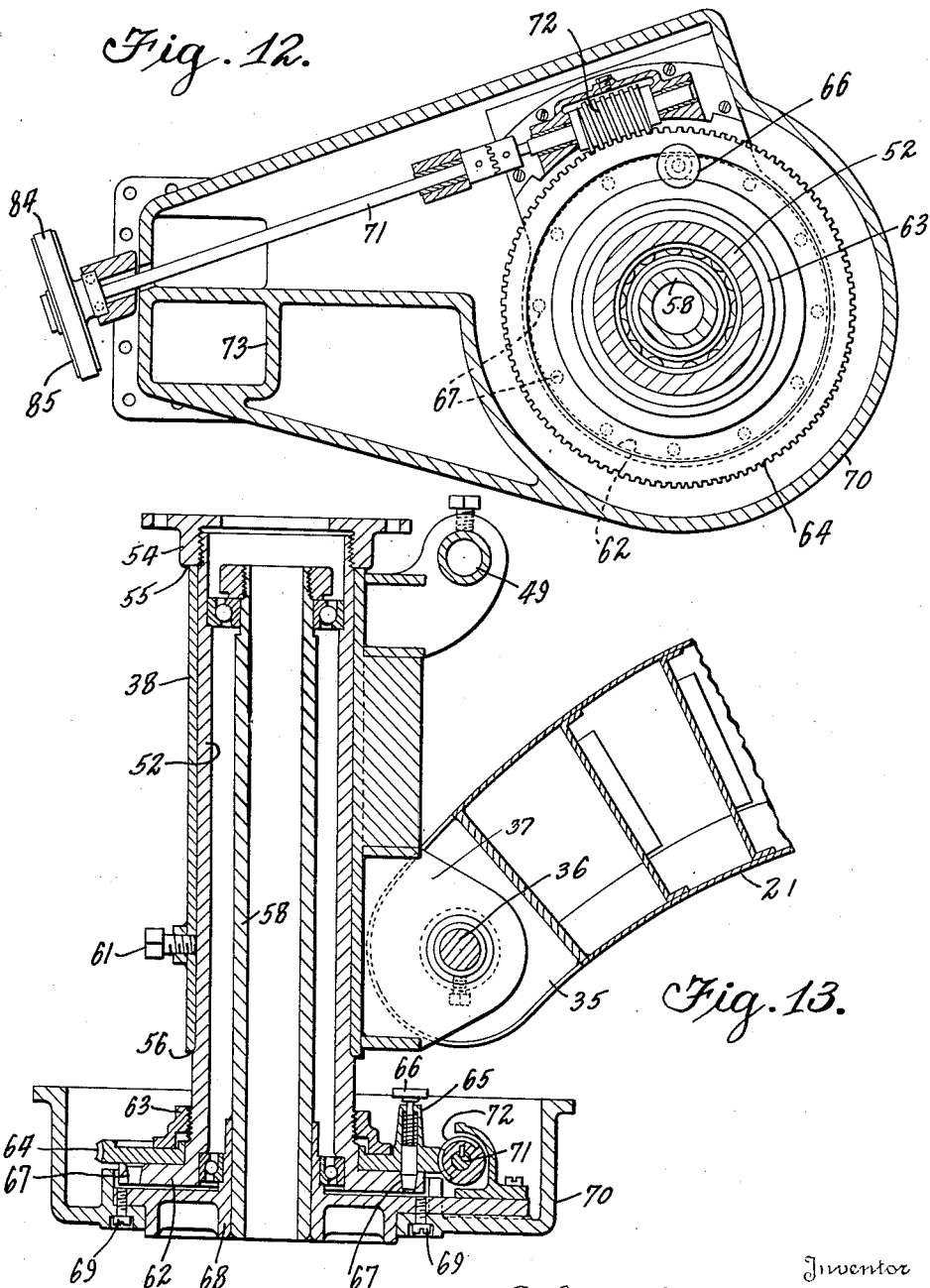

Patented Aug. 13, 1940

2,211,088

UNITED STATES PATENT OFFICE 2,211,088

CAMERA TRUCK

John C. Arnold, West Los Angeles, Calif., assignor to Loew's Incorporated, Culver City, Calif., a corporation of Delaware Application October 3, 1939, Serial No. 297,685

10 Claims. (Cl. 254—7)

My invention relates to camera trucks for movably supporting motion picture cameras. In the motion picture industry it is necessary to have cameras mounted upon a truck to permit a quick and easy change of location. These trucks must be constructed so that the camera lens can be readily turned vertically and horizontally through a wide degree of rotation. The truck must be capable of lowering the lens of the camera practically to the floor level and to various heights thereabove. The truck must also be capable of maintaining the camera free of motion.

The camera trucks now on the market do not permit the camera lens to be lowered sufficiently close to the floor; none of them permits the lens to be lowered nearer than three feet without cutting a hole in the floor of the stage; they are not able to reach through a door and still place the camera in the desired position. The present trucks are balanced by large lead weights placed in a box at one end of the boom to counterbalance the weight of the camera. The trucks are not capable of getting into and out of the furniture or stage fittings. The present trucks are extremely heavy and bulky affairs, often weighing two or three times more than mine.

My truck is capable of being moved into very small quarters, and may be moved around very difficult and small turns; it can be placed through a door or opening and the camera placed at the desired position on the opposite side of the door and then rotated to any desired position. The camera lens can be lowered to within eleven inches from the floor, or high in the air.

It is therefore an object of my invention to produce a truck which is capable of placing the camera lens in any desired position.

It is a further object of my invention to produce a camera-carrying truck which can be raised or lowered to permit passage through the door of the camera and still retain the camera in any desired position.

It is a further object of my invention to produce a camera truck which will permit the camera to be rotated either vertically or horizontally through 360°.

It is a further object of my invention to produce a truck on which two cameras can be simultaneously mounted to permit them to simultaneously photograph the same subject from different positions.

It is a further object of my invention to produce a truck for transporting a camera around objects in the way of the truck, and which may be moved into confined places.

It is a further object of my invention to produce a truck which is less bulky and lighter than any now in use.

Further objects of my invention will appear from the following description and claims.

In the drawings:

Fig. 1 is a side elevation, partly in section.
Fig. 2 is a plan view from above.
Fig. 3 is a vertical section, taken substantially on the line 3—3 of Fig. 1.
Fig. 4 is a plan view of the truck base, partly in section, as indicated on the line 4—4 of Fig. 1.
Fig. 5 is a longitudinal section, taken substantially on the line 5—5 of Fig. 4.
Fig. 6 is a vertical section as indicated by the line 6—6 on Fig. 5.
Fig. 7 is a longitudinal section taken on the line 7—7 of Fig. 4.
Fig. 8 is a section taken on the line 8—8 of Fig. 4.
Fig. 9 is a front elevation, partly in section.
Fig. 10 is an enlarged fragmentary view of the tilting mechanism shown in Fig. 9.
Fig. 11 is a longitudinal section taken substantially on the line 11—11 of Fig. 9.
Fig. 12 is a plan section, taken substantially on the line 12—12 of Fig. 9.
Fig. 13 is a vertical section, taken on the line 13—13 of Fig. 9.
Fig. 14 is a vertical section taken substantially on the line 14—14 of Fig. 1.
Fig. 15 is a section taken on the line 15—15 of Fig. 14.
Fig. 16 is a schematic view, illustrating the pinion and ring gear of Fig. 14.
Fig. 17 is an eccentric stub shaft of the ring gear shown in Fig. 16.

To provide for easy transportation and movement of a camera and boom support around a stage, I have provided a truck 1 having four wheels 106 on axles 107 attached to axle carriers 108 joined together by a frame member 109. To permit steering of the truck 1, steering mechanism 110 is provided. This mechanism 110 is composed of ordinary steering mechanism, such as that manufactured by the Ford Automobile Company, or any other automobile company.

It is often desirable for better steering control to steer both pairs of wheels 106. For this purpose steering mechanism 111 similar to mechanism 110 can be used.

In positioning the truck 1 in difficult positions between furniture, the same problem arises as occurs in parking automobiles. To overcome this difficulty, the truck 1 is equipped with a fifth wheel 112 mounted upon an axle 113 journalled in the crank 114. The crank 114 is pivoted on the frame member 109 on the truck 1 at the opposite end of the frame member 109 from the steering mechanism 110. Ordinarily the crank 114 suspends the wheel 112 above the floor, but rotation of the crank 114 by insertion of a bar in the hole 121 lowers the wheel 112 into engagement with the floor and lifts the wheel 106 at this end of the truck 1 from the floor, permitting this end to be moved sideways. The crank 114 can be retained in either its lowered or lifted position by the spring actuated lock bar 119 engaging the holes 120 in the crank 114. To maintain the truck 1 in position and prevent its motion by a person mounting it, or accidentally pushing it, brakes 122 are provided on the wheels 106. These brakes are ordinary automobile brakes.

To allow complete rotation of the camera-supporting means in relation to the truck 1, I have provided a spindle 2 welded to the frame member 109. The entire camera-supporting means is attached to the carriage 11, which rotates around the spindle 2 on the ball bearings 7 and 8.

When the camera support has been located in a desirable position by rotating the carriage 11 around the spindle 2, I provide means for locking it in position comprising the circular plate 18 welded to the spindle 2 and a locking clamp 20 mounted on a bracket 19 welded to the carriage 11. By tightening the nuts 22 of the clamp 20 against the plate 18, rotation of the carriage 11 is prevented.

In the construction of a camera truck it is necessary that the camera be mounted on the end of a boom attached to the truck and it is desirable that this boom be capable of horizontal rotation, tilting, and that means be provided for raising and lowering the boom at its point of suspension. I have provided means for suspending and for raising and lowering the boom 21 which comprises the column 12 on which is slidably mounted the collar 13. A bracket 23, welded to the collar 13, has a boom pivot 25 mounted in ball bearings 24. The boom pivot 25 is welded to the boom 21 and permits the said boom to be tilted. To raise it at this pivot point, I have provided a reversible motor 14 mounted on the carriage 11, connected through the worm gear 15 to the screw 16. The screw 16 is rotatably mounted between a bearing 28 on the carriage 11 and a bearing formed by a cap 29 on the top of column 12. A nut 17 on the collar 13 rides on the threads of the screw 16 and rotation of the screw 16 by the motor 14 and by the worm gear 15 causes the nut 17 to be raised or lowered, lifting and lowering the column 13 and the boom 21. As the screw 16 is worm gear driven, it can only be rotated by motion imparted to the worm gear 15 and will thus maintain the boom at any height in which it is positioned.

Locking means are desirable to prevent tilting of the boom around the pivot 25 and for this purpose I have provided a radius plate 27 welded to the collar 13 and a clamp 26 similar to clamp 20 attached to the boom 21 for releasably engaging the radius plate 27 and maintaining the boom 21 at any desirable position.

As the boom 21 carries at one end cameras, mechanisms for operating, and seats for operators, it is necessary to compensate for these weights at the other end of the boom and, as these weights are variable, the compensation must be variable. For this purpose I have provided a counterbalance comprising a weight 30, having a nut 31, engaging a screw 32 which is rotatively mounted in the end plate 33 of the boom 21 and has a hand wheel 34 for operation. By rotation of the hand wheel 34, the weight 30 may be slid back and forth in the boom 21 and thus counterbalance any weight on the opposite end of the boom 21.

It is desirable to have a hanger for the camera which is at all times perpendicular to the floor and, for this purpose, I have provided a sleeve 38 having an extension 37 for engaging the pivot 36 mounted in the clevis 35 on the end of the boom 21. To maintain the sleeve 38 perpendicular, the radius rod 50 is provided, which is pivotally connected with the sleeve 38 at 49 and the collar 13 at 51. This radius rod is of such length that the sleeve 38 is always held perpendicular no matter at what angle the boom 21 is tilted.

The camera 82 must be able to pan or rotate horizontally and means for this purpose must be positioned near the camera for operation by the cameraman. In order to accomplish this result, I have provided a hanger with a flat seat for the camera and means for panning, including means for disassembly, for cleaning and repair. This latter element is necessary as the operation of the camera must at all times be smooth and free of jerks.

To support the camera panning means, I provide an inner sleeve 52 which is threaded to engage a cap 54. The cap 54 has a surface 55 bearing on the top of the sleeve 38 and when threaded onto the sleeve 52 draws a shoulder 56 tight against the lower end of the sleeve 38 and prevents rotation between the sleeves. A further prevention of rotation is a lock screw 61. By removing the cap 54, the camera hanger and mechanism supported by the sleeve 52 can be disengaged from the boom 21 for inspection and repair.

The panning means consists of a projection in the form of a circular plate 62 on the lower end of the sleeve 52, a gear retaining ring 63 threaded to the inner sleeve 52 in spaced relation to the plate 62, a gear 64 mounted to rotate around the inner sleeve 52 between the ring 63 and the plate 62, the gear 64 having a projection 65 for a spring actuated plunger 66 which engages holes 67 in the plate 62 and prevents rotation between the gear 64 and the plate 62, a pivot post 58 having a projection 68 welded to its lower end is bolted at 69 to a casing 70 and journaled in this casing 70 is a shaft 71 carrying worm gear 72 engaging the gear 64, and a hanger 73 bolted to the casing 70 and having at its lower end an integral housing 74, and ball bearings 75 and 76 journaled in the housing 74 for supporting the hub 77, and a camera seat formed by the flat surface of the extension 81 of the hub 77, and a shaft 78 journaled in the hub 77 with a pulley wheel 79 carrying a belt 84 and a belt wheel 85 on the end of the shaft 71 for receiving the other end of the belt 84, a belt wheel 80 on the shaft 78 connected by a belt 86 with the belt wheel 87 on the shaft 88 journaled in the extension 81 carrying gear 89 which engages the ring gear 90 having handle 92 for rotation. By rotating the handle 92, the ring gear 90 will rotate through the train of shafts 88, 78, 71, and rotate the worm gear 72 causing the same to run around the fixed gear 64 and thus rotate the hanger 73 and casing 70 on the pivot post 75

58 and permit the camera 82 to be panned in a horizontal direction.

As the camera 82 has a door on the side toward the ring gear 90, means must be provided to lower the ring gear 90 so that access will be had to the door in the camera. The ring gear 90 must normally be above the lowest extremity of the extension 81 so as to permit the camera to be lowered as near the floor as possible. Therefore, I have included a mechanism for rotating the ring gear 90 in and out of the way, comprising a hub 95 journaled in the extension 81 and having an extension 94 in which is journaled the shaft 93 which carries the backing 91 of the ring gear 90. The removable lock pin 96 prevents rotation of the hub 95. As the hub 95 is coaxial with the shaft 88, rotation of the hub 95 will not in any way hamper the action of the panning device aforedescribed.

For the purposes of tilting the camera by its operator, I have provided the following mechanism consisting of the hub 77 rotatively mounted on the ball bearings 75 and 76 journaled in the housing 74, and a hand wheel 98 attached to the shaft 99 journaled in the housing 74 and carrying a worm gear 100 in mesh with a gear 101 mounted between a boss 102 threaded to the hub 77, and a retaining ring 103 bolted to the hub 77, and a locking plunger 104 which is similar in construction and method of operation with the plunger 66. Rotation of the gear 101 will cause the hub 77 and all parts attached to rotate on the bearings 75 and 76 around the center of the hub, which is coaxial with the shaft 78, thus tilting the camera 82 without interfering with the panning mechanism aforesaid described.

In preliminarily setting up of the camera, it is not desirable to have to screw the panning and tilting mechanisms by means of the worm gears and, to provide a means of quickly achieving these results, I have provided means whereby the gears 101 and 64 may be released and thus permit their rotation without the necessity of rotating the worm gears 100 and 72. The plunger 66 or the plunger 104 may be pulled out of engagement with the gears 64 and 101 and thus permit their free movement.

It is often desirable to have two cameras taking pictures from different elevations. I have provided means for this by permitting an extension post 125 bolted to the cap 54, upon which may be mounted an ordinary camera and tilting and panning device, which are common in the art, and also a seat 126 for an operator of the camera. A seat 83 is attached to the extension 81 to permit the camera operator to more closely follow his camera.

In the taking of pictures, the operation of the boom 21 by an operator is facilitated by a ramp carried by the truck 1. This ramp permits an operator to be at all times on the truck and in this way not jar the camera by getting on and off of the truck for the purpose of moving the boom at its tilting or pivoting points. I have provided the post 115 welded to the axle carriers 108, to which is bolted a ramp or runway 116, upon which the man operating the boom may stand. This ramp is in the form of a circular ramp which may run in a circle entirely around the truck or it may be merely a half circle at one end or the other. The handle 118, attached to the runway 116, provides means for pushing the truck from place to place. The handle 117, which is pivoted at 119, may be used by the operator for swinging the boom. This handle is pivoted at 117a to permit it to hang down when the boom is tilted as it would be impossible to reach a handle normally attached to the boom 21.

While I have described the preferred form of my invention, I am not limited in my invention except as set forth in the appended claims.

I claim:

1. In a camera supporting mechanism, the combination of a truck, a pivotally mounted column, a boom on said column, means for tilting said boom, means for raising and lowering said boom, a camera supporting platform, and means for tilting and panning said platform.

2. In a camera truck, the combination of a truck frame supported on wheels, a pivot on said frame, a carriage rotatively mounted on said pivot carrying a column, a boom slidably mounted on said column, means for raising and lowering the boom on said column, tilting means between said column and said boom, a camera hanger on said boom, means for panning a camera on said hanger, means for tilting a camera on said hanger, and means for maintaining the hanger in a vertical position.

3. In a camera truck, the combination of a truck frame supported on wheels, a pivot on said frame, a carriage rotatively mounted on said pivot carrying a column, a boom slidably mounted on said column, tilting means between said column and said boom, a camera hanger on said boom, means for panning a camera on said hanger, means for tilting a camera on said hanger, and means for raising and lowering said boom on said column.

4. In a camera supporting mechanism, the combination of a truck, a pivot on said truck, a carriage rotatively mounted on said pivot carrying a column, a collar slidably mounted on said column, means for raising and lowering said collar on said column, a pivot carried by said collar, a boom mounted on said last mentioned pivot, releasable locking means to prevent tilting of the boom around the last mentioned pivot, a sleeve carried at one end of said boom, means for holding said sleeve in a vertical position when said boom is tilted, an inner sleeve detachably mounted in said sleeve having mounting means for a gear, a worm gear for engaging said gear, a hanger attached to a pivot mounted on said inner sleeve in which said worm gear is journaled, means for rotating said worm gear and causing said hanger to revolve, a hub rotatively mounted on said hanger, an extension on said hub on which is mounted a camera, and means for rotating said hub to tilt said camera.

5. In a camera supporting mechanism, the combination of a truck, a pivot on said truck, a carriage rotatively mounted on said pivot carrying a column, a collar slidably mounted on said column, means for raising and lowering said collar on said column, a pivot carried by said collar, a boom mounted on said last mentioned pivot, releasable locking means to prevent tilting of the boom around the last mentioned pivot, a sleeve carried at one end of said boom, means for holding said sleeve in a vertical position when said boom is tilted, an inner sleeve detachably mounted in said sleeve having mounting means for a gear, a worm gear for engaging said gear, a hanger attached to a pivot mounted on said inner sleeve in which said worm gear is journaled, means for rotating said worm gear and causing said hanger to revolve, a hub rotatively mounted on said hanger, an extension on said hub on which is mounted a camera, means for rotating said hub to tilt said camera, and a post attached to said sleeve for mounting a second camera.

6. In a camera supporting mechanism, the combination of a truck, a pivot on said truck, a carriage rotatively mounted on said pivot carrying a column, a collar slidably mounted on said column, means for raising and lowering said collar on said column, a pivot carried by said collar, a boom mounted on said last mentioned pivot, releasable locking means to prevent tilting of the boom around the last mentioned pivot, a sleeve carried at one end of said boom, means for holding said sleeve in a vertical position when said boom is tilted, an inner sleeve detachably mounted in said sleeve having mounting means for a gear, a worm gear for engaging said gear, a hanger attached to a pivot mounted on said inner sleeve in which said worm gear is journaled, means for rotating said worm gear and causing said hanger to revolve, a hub rotatively mounted on said hanger, an extension on said hub on which is mounted a camera, means for rotating said hub to tilt said camera, and means for counterbalancing said boom comprising a weight slidably mounted on one end of said boom.

7. In a camera supporting mechanism, the combination of a truck, a pivot on said truck, a carriage rotatively mounted on said pivot carrying a column, a collar slidably mounted on said column, means for raising and lowering said collar on said column, a pivot carried by said collar, a boom mounted on said last mentioned pivot, a sleeve carried at one end of said boom, means for holding said sleeve in a vertical position when said boom is tilted, an inner sleeve detachably mounted in said sleeve having mounting means for a gear, a worm gear for engaging said gear, a hanger attached to a pivot mounted on said inner sleeve in which said worm gear is journalled, means for rotating said worm gear and causing said hanger to revolve, a hub rotatively mounted on said hanger, an extension on said hub on which is mounted a camera, and means for rotating said hub to tilt said camera.

8. In a camera supporting mechanism, the combination of a truck, a pivot on said truck, a carriage rotatively mounted on said pivot carrying a column, a releasable locking mechanism on said carriage for engaging a plate mounted on said pivot to prevent rotation of said carriage around said pivot, a collar slidably mounted on said column, means for raising and lowering said collar on said column, a pivot carried by said collar, a boom mounted on said last mentioned pivot, releasable locking means to prevent tilting of the boom around the last mentioned pivot, a sleeve carried at one end of said boom, means for holding said sleeve in a vertical position when said boom is tilted, an inner sleeve detachably mounted in said sleeve having mounting means for a gear, a worm gear for engaging said gear, a hanger attached to a pivot mounted on said inner sleeve in which said worm gear is journaled, means for rotating said worm gear and causing said hanger to revolve, a hub rotatively mounted on said hanger, an extension on said hub on which is mounted a camera, and means for rotating said hub to tilt said camera.

9. In a camera boom, the combination of a truck, a pivotally mounted column, a boom pivoted for tilting on a collar, said collar mounted on said column and means of raising and lowering said collar on said column.

10. In a camera boom, the combination of a truck, a pivotally mounted column, a boom pivoted for tilting on a collar, said collar mounted on said column, means of raising and lowering said collar on said column, a camera supported on said boom and means for bending and tilting said camera support.

JOHN C. ARNOLD